United States Patent
Hansson et al.

(10) Patent No.: US 7,228,138 B2
(45) Date of Patent: Jun. 5, 2007

(54) METHODS, SERVERS, MOBILE STATIONS, AND COMPUTER PROGRAM PRODUCTS USING GPS REFERENCED TIME AND DELAY INFORMATION IN MESSAGES FOR GPS TIME ASSISTANCE

(75) Inventors: Björn Hansson, Malmo (SE); Magnus Jendbro, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 215 days.

(21) Appl. No.: 10/729,354

(22) Filed: Dec. 5, 2003

(65) Prior Publication Data

US 2005/0124390 A1    Jun. 9, 2005

(51) Int. Cl.
*H04Q 7/20*    (2006.01)
(52) U.S. Cl. .............................. 455/456.1; 455/456.2; 455/456.3; 455/456.5; 455/456.6; 455/440; 342/357.03; 342/357.07; 701/207; 701/214; 701/216
(58) Field of Classification Search ............ 455/422.1, 455/429, 432.1, 440, 456.1–457, 502, 503, 455/3.01; 342/357.03, 357.07; 701/207, 701/214, 216
See application file for complete search history.

(56) References Cited

U.S. PATENT DOCUMENTS

| | | | |
|---|---|---|---|
| 5,787,384 A * | 7/1998 | Johnson | 701/216 |
| 5,938,721 A * | 8/1999 | Dussell et al. | 701/211 |
| 6,084,544 A * | 7/2000 | Camp, Jr. | 342/357.15 |
| 6,134,483 A * | 10/2000 | Vayanos et al. | 701/13 |
| 6,204,808 B1 | 3/2001 | Bloebaum et al. | 342/357.07 |
| 6,266,533 B1 * | 7/2001 | Zadeh et al. | 455/456.2 |
| 6,295,023 B1 * | 9/2001 | Bloebaum | 342/357.06 |
| 6,295,454 B1 * | 9/2001 | Havinis et al. | 455/456.3 |
| 6,323,803 B1 | 11/2001 | Jolley et al. | 342/357.03 |
| 6,324,170 B1 * | 11/2001 | McClennon et al. | 370/286 |
| 6,429,811 B1 * | 8/2002 | Zhao et al. | 342/357.09 |
| 6,473,030 B1 * | 10/2002 | McBurney et al. | 342/357.03 |
| 6,510,387 B2 * | 1/2003 | Fuchs et al. | 701/213 |
| 6,603,978 B1 | 8/2003 | Carlsson et al. | 455/502 |
| 6,687,501 B2 * | 2/2004 | Soliman | 455/424 |
| 6,748,202 B2 * | 6/2004 | Syrjarinne et al. | 455/255 |
| 2003/0107513 A1 * | 6/2003 | Abraham et al. | 342/357.1 |
| 2004/0142660 A1 * | 7/2004 | Churan | 455/12.1 |

OTHER PUBLICATIONS

Postel, J. "ICMP DARPA IP Spec", ISI, pp. 1-15 (Sep. 1981) www.faqs.org/rfcs/rfc792.html.*
Haartsen, Jaap. "BLUETOOTH—The Universal Radio Interface for Ad Hoc, Wireless Connectivity," *Ericsson Review* No. 3 pp. 110-117 (1998).
Postel J. "Internet Control Message Protocol DARPA Internet Program Protocol Specification," ISI, pp. 1-15 (Sep. 1981) www.faqs.org/rfcs/rfc792.html.

* cited by examiner

*Primary Examiner*—Steve M. D'Agosta
(74) *Attorney, Agent, or Firm*—Myers Bigel Sibley & Sajovec, P.A.

(57) ABSTRACT

A message is transmitted from a networked GPS time server to a mobile station, the message includes GPS referenced time information indicating an elapsed GPS referenced time interval at the networked GPS time server between receiving a request for GPS time assistance at the networked GPS time server and transmitting the message to the mobile station.

34 Claims, 4 Drawing Sheets

METHODS, SERVERS, MOBILE STATIONS, AND COMPUTER PROGRAM PRODUCTS USING GPS REFERENCED TIME AND DELAY INFORMATION IN MESSAGES FOR GPS TIME ASSISTANCE

FIELD OF THE INVENTION

This invention relates to the field of global positioning, and more particularly to methods, servers, mobile stations and computer program products for GPS time assistance information.

BACKGROUND

Satellite positioning receivers can determine their position by computing relative times of arrival of signals transmitted simultaneously from satellites such as the U.S. Global Positioning System (GPS) or NAVSTAR satellites. For example, the GPS Orbital Constellation has 28 satellites which orbit the earth in about 12 hour orbits. This constellation provides a satellite positioning receiver with approximately four to twelve satellites visible from any point on earth. These satellites transmit, as part of their message, both satellite positioning data, so-called "ephemeris" data, as well as clock timing data In addition, the satellites transmit time-of-week (TOW) information associated with the satellite signal, which can enable a receiver to determine GPS referenced time at the receiver.

The receiver can determine a location (and accurate time-of day) by searching for and acquiring GPS signals that include the ephemeris and other data for a multiplicity of satellites. The process of searching and acquiring may sometimes require several minutes to complete. In some applications, these several minutes may be unacceptably long, and furthermore, may reduce battery life in portable applications.

It is known to provide GPS time assistance to receivers to reduce the time needed for the receiver to determine a location. In particular, the GPS time assistance can allow the receiver to more accurately predict satellite positions and velocities that can allow the receiver to narrow a frequency search window which can reduce the acquisition time. It is also known to provide GPS time assistance to mobile stations in Global System for Mobile telecommunications (GSM) networks. It is also known to provide GPS time assistance to mobile stations via the Internet using TCP/IP via General Packet Radio Service (GPRS) or any other data service, such as dial-up GSM-data service.

SUMMARY

Embodiments according to the invention can provide methods, servers, mobile stations, and computer program products that use GPS referenced time and delay information in messages for GPS time assistance. Pursuant to these embodiments, a message is transmitted from a networked GPS time server to a mobile station, the message includes GPS referenced time information indicating an elapsed GPS referenced time interval at the networked GPS time server between receiving a request for GPS time assistance at the networked GPS time server and transmitting the message to the mobile station.

For example, the mobile stations are configured to transmit GPS time assistance requests for GPS time assistance information to a networked GPS time server that is accessible via a network. In response, the networked GPS time server accesses GPS reference time at a GPS time source that accurately reflects time associated with the GPS. The networked GPS time server transmits a single GPS time assistance message to the mobile, station including, GPS referenced time information, in response to the GPS time assistance request. The mobile station determines the current GPS referenced time at the mobile station from the GPS time assistance information included in the single message.

DESCRIPTION OF EMBODIMENTS ACCORDING TO THE INVENTION

Figure 1:
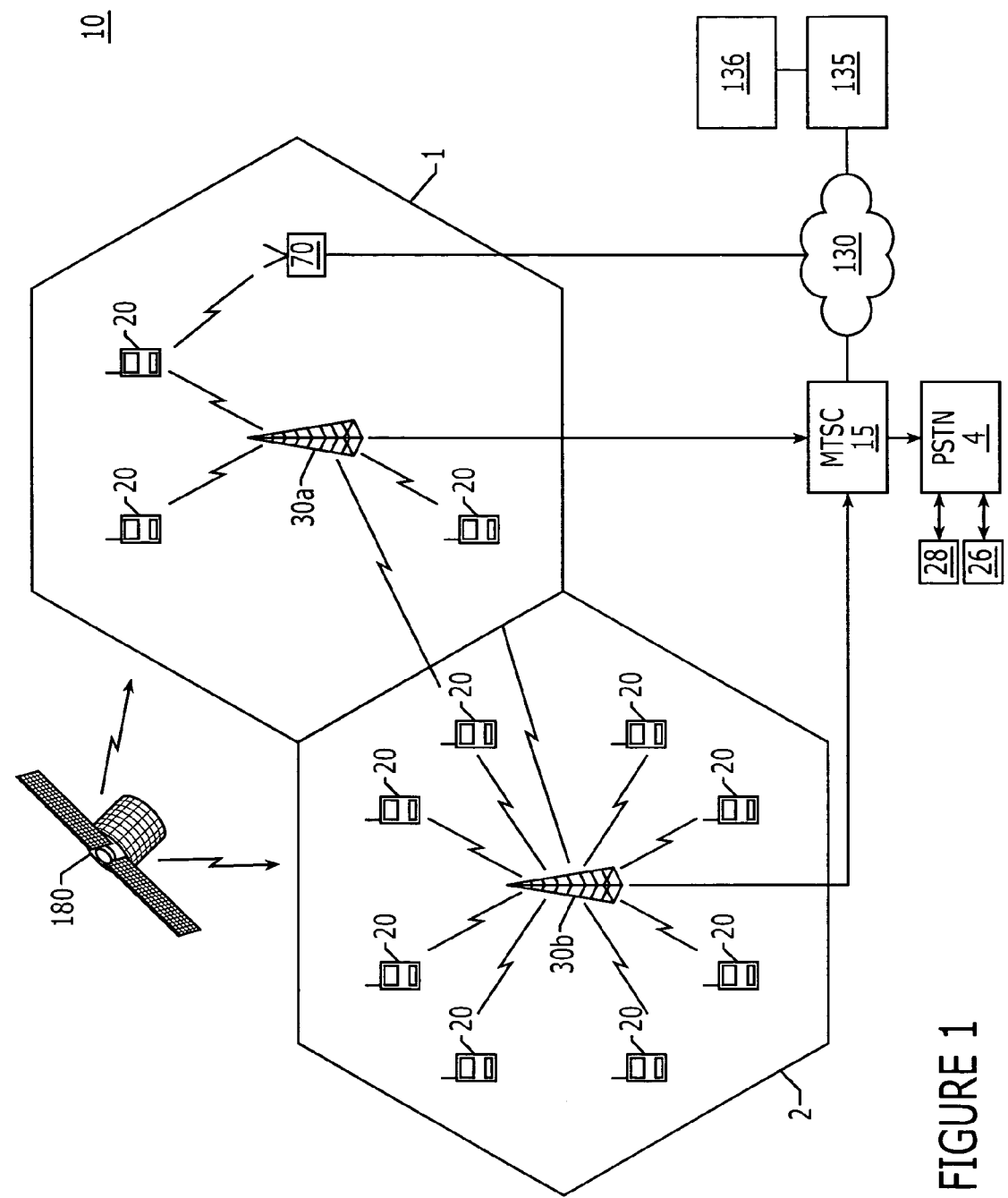
FIG. 1 is a block diagram of a communications system coupled to a networked GPS time server according to some embodiments of the invention.

The invention is described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments according to the invention are described with reference to block diagrams and/or operational illustrations of methods, server, mobile stations, and computer program products. It is understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "mobile station" includes, but is not limited to, a terminal that is configured to communicate via a wireless interface such as, for example, a cellular interface, a wireless local area network interface (WLAN), Bluetooth interface, another RF communication interface, and/or an optical interface. Example mobile stations include, but are not limited to, a cellular mobile station; a personal communication terminal that may combine a cellular mobile station with data processing, facsimile and data communications capabilities; a personal data assistance (PDA) that can include a wireless transceiver, pager, Internet/intranet access, local area network interface, wide area network interface, Web browser, organizer, and/or calendar; and a mobile or fixed computer or other device that includes a wireless transceiver.

Mobile stations according to embodiments of the invention may be configured to communicate via a cellular communication link that may include a protocol such as, for example, ANSI-136, Global Standard for Mobile (GSM) communication, 10 General Packet Radio Service (GPRS), enhanced data rates for GSM evolution (EDGE), code division multiple access (CDMA), wideband-CDMA, CDMA2000, and UMTS. Communication protocols as used herein may specify the information communicated, the timing, the frequency, the modulation, and/or the operations for setting-up and/or maintaining a communication connection. It will be understood that the invention can be utilized in other types of systems.

The invention may also be used in celestial communications systems, such as satellite communications systems. The celestial wireless communication system may be employed to perform similar functions to those performed by the wireless communications networks described herein. In particular, the celestial wireless communication system typically includes one or more satellites that serve as relays or transponders between one or more earth stations and (satellite) mobile stations. The satellites typically communicate with the satellite mobile stations and earth stations via duplex communication links. Each earth station may, in turn, be connected to a Public Switched Telephone Network, thereby allowing communications between the satellite mobile stations, and other terminals included in any other system with which the celestial wireless communication system is integrated.

The celestial wireless communication system may utilize a single antenna beam covering the entire geographic region served by the system or the celestial wireless communication system may be designed such that it produces multiple overlapping or non-overlapping beams that serve different sub-regions of the entire geographic region served by the celestial wireless-communications system. The satellites and the respective sub-regions may serve a function similar to that of the base stations and the associated cells in a typical terrestrial wireless communications network.

According to FIG. 1, a plurality of mobile stations 20 can communicate with each other in a wireless communications network 10 via a Mobile Telephone Switching Center (MTSC) 15. The mobile stations 20 can also communicate with other terminals, such as terminals 26, 28, via a Public Service Telephone Network (PSTN) 4 that is coupled to the network 10.

The wireless communications network 10 is organized as cells 1–2 that collectively can provide service to a geographic region. In particular, each of the cells 1–2 can provide service to associated sub-regions included in the geographic region covered by the network 10. More or fewer cells can be included in the network 10, and the coverage area for some of the cells in the network 10 may overlap one another. Base stations 30a–b in the cells 1–2 provide wireless communications between each other and the mobile stations 20 located in the geographic region of the cell to allow for communications between the mobile stations 20 and/or the terminals 26, 28 in the PSTN 4.

Each of the base stations 30a–b can transmit/receive data to/from the mobile stations 20 over an associated control channel. For example, the base station 30a can communicate with the mobile stations 20 located in cell 1 over associated control channels (not shown). The control channels can be used to page the mobile stations 20 in response to calls directed thereto or to transmit traffic channel assignments to the mobile stations 20 over which a call associated therewith is to be conducted. The control channels can be identified using control channel numbers or identifiers. For example, the mobile stations 20 can store a channel number that identifies the control channel on which it is currently camping.

The mobile stations 20 are capable of determining respective mobile station geographic location information that describes the geographic location of the mobile stations 20 using. GPS signals provided by a Global Positioning System (GPS) 180 and GPS referenced timing information. In particular, the mobile stations 20 can use the GPS signals to determine their respective geographic locations. It will be understood that the single satellite shown in FIG. 1 represents the GPS 180, which can include a constellation of GPS satellites. It will be understood that in some embodiments according to the invention, the mobile station geographic location can be determined based on other types of location systems such as GALILEO and GLONASS. Systems and methods of determining a position based on GPS signals such as those disclosed above are well known in the art.

The mobile stations 20 are configured to transmit GPS time assistance requests 140 for GPS time assistance information to a networked GPS time server 135 that is coupled to the MTSC 15 via a network 130. In response, the networked GPS time server 135 accesses GPS reference time at a GPS time source 136 that accurately reflects time associated with the GPS 180.

The networked GPS time server 135 transmits a single GPS time assistance message 141 to the mobile station 20 including, GPS referenced time information, in response to the GPS time assistance request 140. The mobile station 20 determines the current GPS referenced time at the mobile station 20 from the GPS time assistance information included in the single message 141.

Although embodiments according to the invention are described above in reference to a single GPS time assistance message; it will be understood that additional messages can be used in other embodiments according to the invention. For example, in some embodiments according to the invention, subsequent messages can be sent including information related to the single message. However GPS referenced time information (as well as propagation delay information) are included in the single GPS time assistance message.

The GPS referenced time information included in the single message 141 includes at least a GPS referenced time interval that indicates the time elapsed between receipt of the request 140 at the networked GPS time server 135 and the transmission of the single message 141 therefrom. In some embodiments according to the invention, the GPS referenced time information can include delay information associated with the propagation of the message 141 from the networked GPS time server 135 to the mobile station 20 which made the request 140. It will be understood that the delay associated with the propagation of message 141 includes the time needed for the message 141 to propagate through the network 130 to the mobile station 20 that made the request through, for example, the MTSC 15.

It will be understood that the mobile stations 20 may be in communication with other networks that enable communication with the networked GPS time server 135. For example, in some embodiments according to the invention, the mobile stations 20 may communicate with a local wireless network 70 that is, for example, connected to the network 130 through which the networked GPS time server 135 is accessible. In some embodiments according to the invention, the local wireless network 70 is a WLAN interface (such as a series protocol 802.11 b, -11a or -11g compliant network interface) that enables the compliant mobile stations 20 to communicate with the local wireless network 70. It will be understood that communications between the mobile stations 20 and the local wireless network 70 may occur simultaneous with communications with the communications network 10.

In some embodiments according to the invention, the local wireless network 70 represents an "ad hoc" network, such as a Bluetooth compliant network, that is coupled to the network 130 through which the GPS time server 135 is accessible. As used herein, an "ad hoc" protocol network or transmitter refers to one that is generally configured at the time of use based on the resources available. Such networks, typically, provide a service discovery protocol to allow, for example, identification of available resources. They may also negotiate various aspects of operations, such as peer relationships between resources, at the time of use of the resources.

As understood by those skilled in the art, Bluetooth™ is directed to providing a relatively robust high-speed wireless connection with low-power consumption and a low-cost architecture. Bluetooth™ technology may provide a universal radio interface in the 2.45 GHz frequency band to enable portable electronic devices to connect and communicate wirelessly via short-range ad hoc networks. Bluetooth™ technology is generally targeted towards the elimination of wires, cables, and connectors between such devices and systems as cordless or mobile phones, modems, headsets, personal digital assistants (PDAs), computers, printers, projectors, and local area networks. The Bluetooth™ interface is further described in an article authored by Jaap Haartsen entitled Bluetooth—The universal radio interface for ad hoc, wireless connectivity, Ericsson Review, No. 3, 1998, which is hereby incorporated herein by reference in its entirety.

Figure 2:
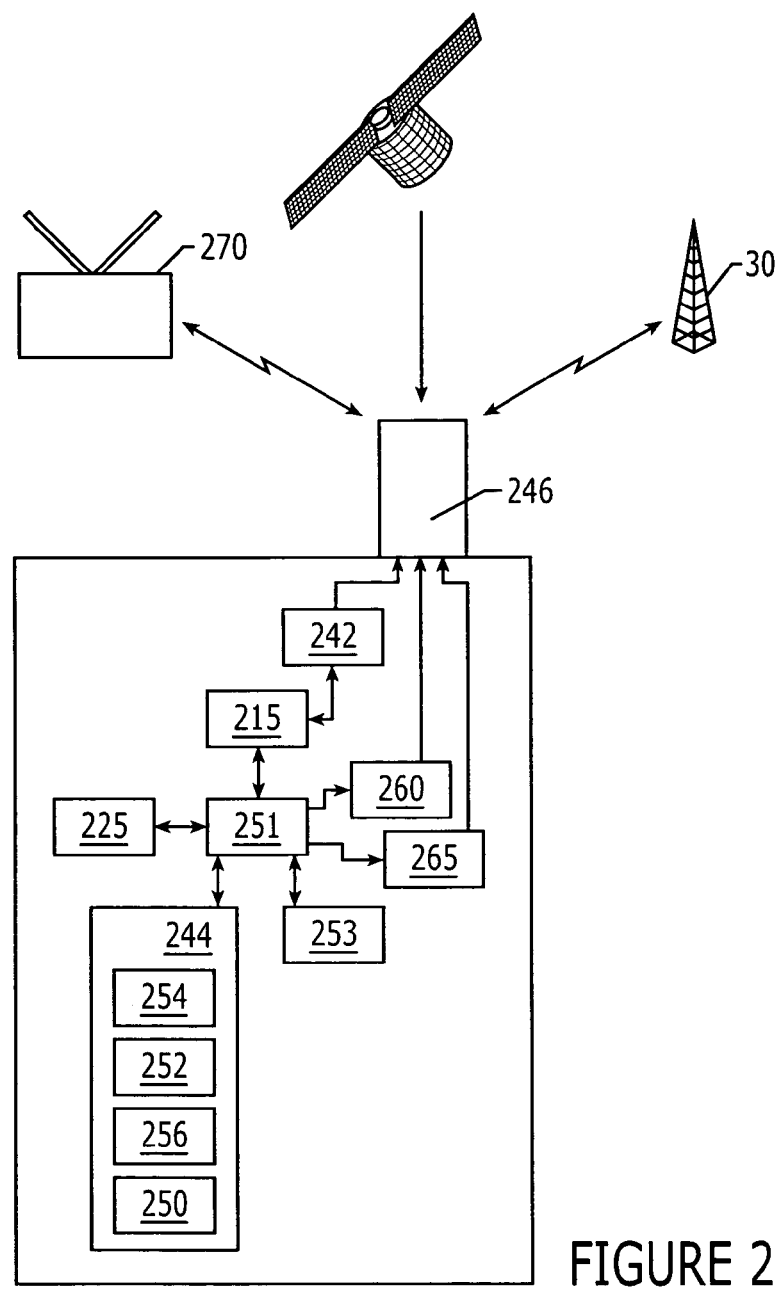
FIG. 2 is a block diagram of a mobile station according to some embodiments of the invention.

FIG. 2 is a block diagram that illustrates embodiments of mobile stations 20 according to the invention. As illustrated in FIG. 2, the mobile stations 20 include a transceiver circuit 242 that is operative to transmit and receive radio frequency communication signals to the network 10 via an antenna system 246. The antenna system 246 may include an antenna feed structure and one or more antennas.

As is well known to those of skill in the art, a transmitter portion of the transceiver 242 converts the information, which is to be transmitted by the mobile station 20 into electromagnetic signals suitable for radio communications. A receiver portion of the transceiver 242 demodulates electromagnetic signals, which are received by the mobile station 20 from the network 10 to provide the information contained in the signals in a format, which is understandable to the user.

A user interface 244 of the mobile station 20 may include a variety of components, such as a display 254, a keypad 252, a speaker 256, and a microphone 250, operations of which are known to those of skill in the art. It will be understood that the functions of keypad 252 and the display 254 can be provided by a touch screen through which the user can view information, such as computer displayable documents, provide input thereto, and otherwise control the mobile station 20. It will be understood by those skilled in the art that computer displayable documents (or Web pages) can be, for example, hypertext documents, which can include text, images, input fields, output fields, and a variety of other objects.

A processor circuit 251 can provide for overall operation of the mobile station 20 including coordination of communications via the transceiver circuit 242, the user interface 244, and other components and systems included in the mobile station 20. For example the processor circuit 251 can provide communications signals to the transceiver circuit 242 when the user speaks into the microphone 250 and receives communications signals from the transceiver 242 for the reproduction of audio through the speaker 256. The processor circuit 251 can generate characters for display on the display 254. For example, the processor circuit 251 can generate numbers for display when the user enters a telephone number on the keypad 252. The characters can also be generated by a character generator circuit, which is not shown.

The processor circuit 251 initiates GPS time assistance requests for GPS referenced time information to the networked GPS time server 135. In some embodiments according to the invention, the requests can take the form of an Internet Control Message Protocol (ICMP) time stamp request message that can include a time stamp indicating the time, referenced to the mobile station 20, at which the request was transmitted to the networked GPS time server 135.

The processor circuit 251 is also configured to receive the single messages from the networked GPS time server 135 including the requested GPS referenced time information. The processor circuit 251 uses the GPS referenced time information included in the message to determine a current GPS referenced time at the mobile station 20.

The processor circuit 251 can provide the current GPS referenced time to a GPS time circuit 260 which can then determine a geographic location for the mobile station 20. It will be understood that although the operations discussed above are described as being carried out by the processor circuit 251, these operations may alternatively be carried out by specialized circuitry and/or software located outside the processor circuit 251 (such as such circuitry located within the GPS location circuit 260 itself). It will be further understood that the processor circuit 251 may implement support for a low level Internetworking layer protocol (which is sometimes referred to as "the IP layer") to provide what is commonly referred to collectively as an IP stack.

Figure 5:
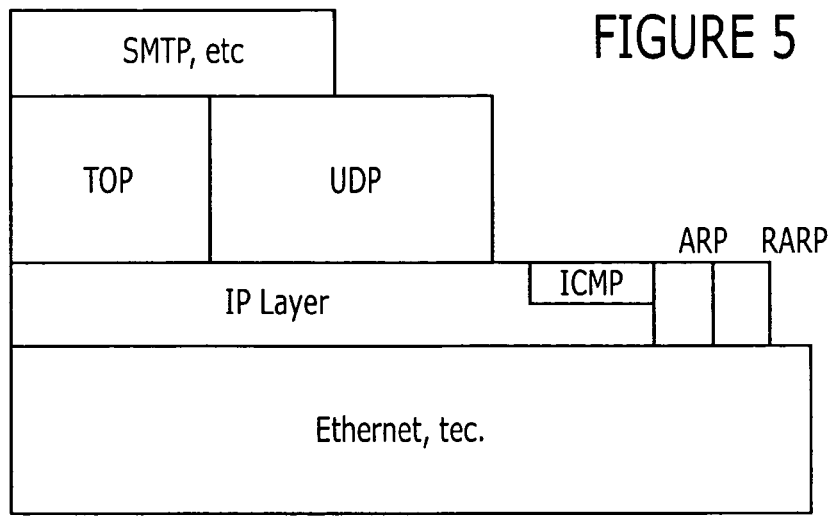
FIG. 5 is a schematic representation of an IP stack according to some embodiments of the invention.

As is well understood in the art, an IP stack can be used to provide a virtual network image of a network which shields higher level protocols from the attributes of the physical network architecture to which the IP stack interfaces, as shown in FIG. 5. It will be further understood that the IP stack can enable the processor circuit 251 to carry out the GPS time assistance requests 140 and process the GPS time assistance messages 141 according to embodiments of the invention.

The IP layer of the IP stack may be accessed by higher level layers of the IP stack, which higher level applications can use to access the IP layer. For example, the processor circuit 251 may employ higher level applications that access the IP layer of the stack through uppers layers in the IP layer (i.e., above the IP layer in the IP stack). For example, the processor circuit 251 may employ an application that generates ICMP time stamp requests and monitors the success/failure of those requests to ensure that the required requests are successfully transmitted through the GPS networked time server. Similarly, the processor circuit 251 may employ a higher level application that accesses the IP layer through the higher layers of the IP stack to access the GPS referenced time information that is included with the message 141. It will be understood that IP stack can include other protocols within the IP layer, such as IGMP, ARP, and RARP.

Referring again to FIG. 2, the processor circuit 251 may be implemented using a variety of hardware and software. For example, operations of the processor circuit 251 may be implemented using special-purpose hardware, such as an Application Specific Integrated Circuit (ASIC) and programmable logic devices such as gate arrays, and/or software or firmware running on a computing device such as a microprocessor, microcontroller or digital signal processor (DSP). The processor circuit 251 may provide digital signal processing operations such as scanning for an acceptable control channel, camping on a control channel (including maintaining synchronization with the base station that communicates with the mobile station 20), Voice Activated Dialing (VAD) services, and the like.

A memory 253 can store computer program instructions that, when executed by the processor circuit 251, carry out the operations described herein and shown in the figures. The memory 253 can be non-volatile memory, such as EEPROM (or flash memory), that retains the stored data while power is removed from the memory 253.

The mobile station 20 includes a GPS location circuit 260 that is configured to determine a geographic location for the mobile station 20 based on the GPS time information included in the single message 141 received from the networked GPS time server 135. The GPS time information included in the message 141 can allow the GPS location circuit 260 to more quickly search for and acquire GPS signals from the GPS 180, thereby providing a location for the mobile terminal more quickly.

The mobile station 20 further includes a local wireless interface circuit 265 that can provide communication with the local wireless network(as discussed above). In some embodiments according to the invention, the local wireless interface circuit 265 is a WLAN compliant interface. In some embodiments according to the invention, the local wireless interface circuit 265 is a Bluetooth compliant interface. Accordingly, the local wireless interface circuit 265 can be used to transmit the requests 140 for GPS time assistance information to the networked GPS server 135 via the local wireless network 270. Similarly, messages 142 including GPS referenced time information can be received via the local wireless interface circuit 265. Therefore, in some embodiments according to the invention, the requests 140 and/or messages 141 can be transmitted to/from the networked GPS time server 135 either via the base station 30 (i.e., via the wireless communications network 10) or via the local wireless network 270.

Figure 3:
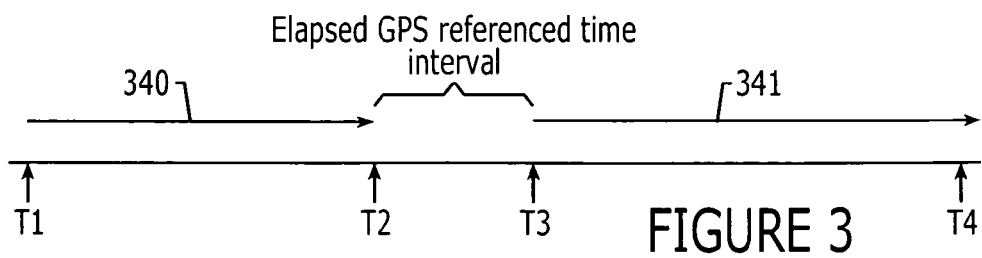
FIG. 3 is a schematic timeline that illustrates exemplary timing associated with GPS time assistance requests and messages according to some embodiments of the invention.

FIG. 3 is a flow diagram that illustrates exemplary times associated with requests for and messages including GPS time information according to some embodiments of the invention. As shown in FIG. 3, the mobile station transmits a request for GPS time assistance information at a time T1 that is referenced to the mobile station. For example, the time T1 can be a time value indicated by a real time counter implemented within the mobile station. The request 340 propagates through the network to the networked GPS time server which receives the request at a GPS referenced time T2. The GPS referenced time T2 can be provided, for example, by a GPS time source that is accessible from the networked GPS time server which provides the accurate GPS time according to the GPS 180 shown in FIG. 1.

The networked GPS time server processes the request during an elapsed time interval at the networked GPS time server and transmits a GPS time assistance message 341 at a GPS referenced time T3. The GPS referenced time T3 can also be provided by the GPS time source accessible to the networked GPS time server. The GPS time assistance message 341 includes GPS referenced time information, such as the time stamps T2 and T3, which reflects the elapsed time interval which occurred at the networked GPS time server between the time T2 when the server received the request and the time T3 when the corresponding message was transmitted back to the mobile station that made the request.

In some embodiments according to the invention, the GPS referenced time information can also include the time stamp T1 which indicates the time (referenced to the mobile station) at which the mobile station transmitted the request 340. The GPS time assistance message 341 propagates through the network and is received by the mobile station at a time T4 referenced to the mobile station. Accordingly, the mobile station can utilize the time stamps included in the GPS time information to determine a current GPS referenced time at the mobile station.

The mobile station can determine a delay associated with the propagation of the message 341 from the networked GPS time server to the mobile station, which may then be added to the GPS referenced time at which the message was transmitted to the mobile station (e.g. T3). For example, in some embodiments according to the invention, the current GPS referenced time at the mobile station can be given by:

$$T3+((T4-T1)-(T3-T2))/2. \qquad (1)$$

It will be understood that the times included in the GPS referenced time information can be at different granularities (or scales). For example, in some embodiments according to the invention, the time stamps T1 and T2 can be provided in milliseconds whereas the time stamps T3 and T4 can be provided at a finer or coarser granularity (such as tens of milliseconds). In some embodiments according to the invention, different time granularities between the GPS time server and the mobile station can be compensated for by including a scaling factor in Equation 1 so that the granularity of the time stamps are equivalent.

Figure 4:
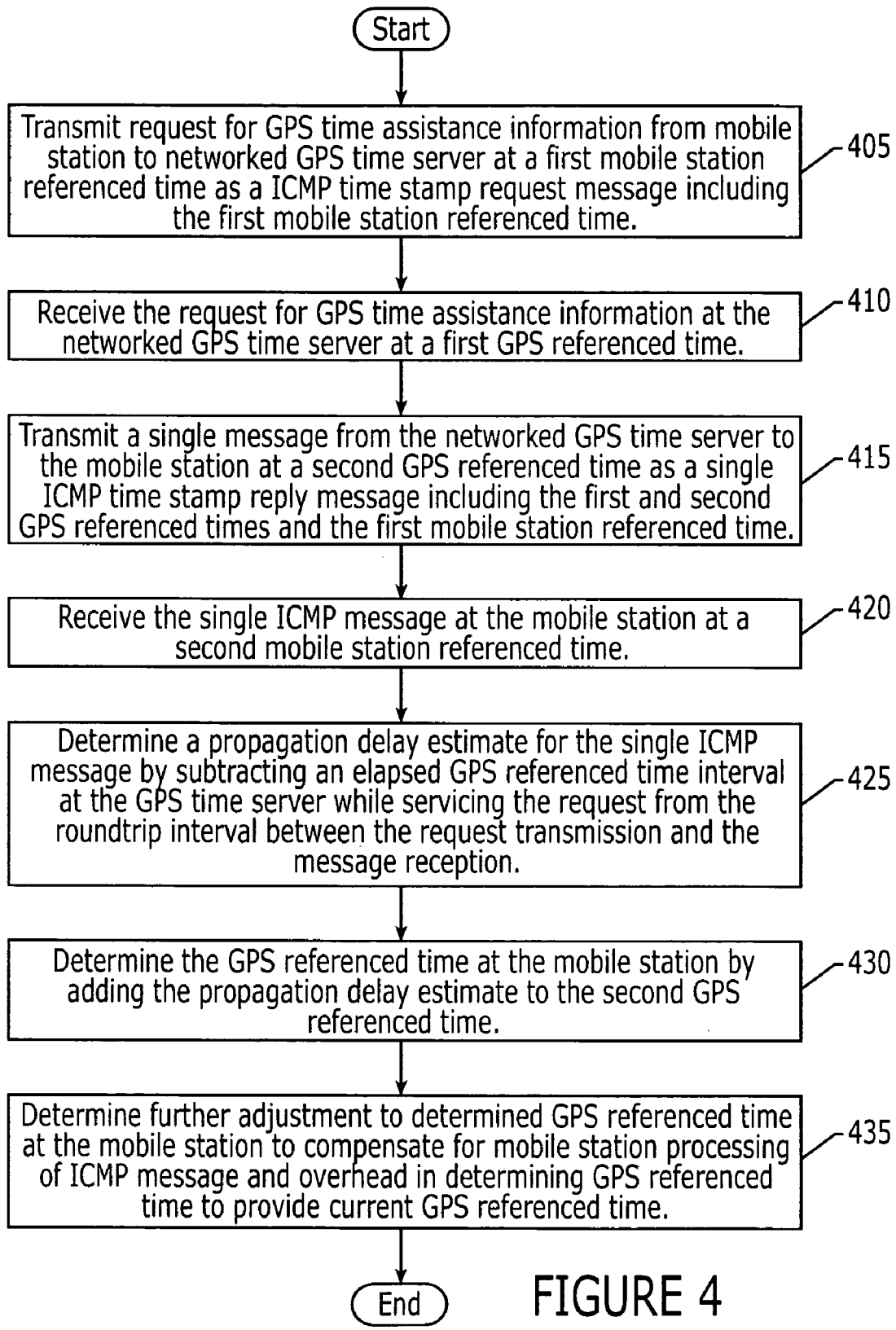
FIG. 4 is a flow chart that illustrates operations according to some embodiments of the invention.

FIG. 4 is a flow chart that illustrates operations of some embodiments according to the invention. A request for GPS time assistance information is transmitted from the mobile station to the networked GPS time server at a first mobile station reference time as an ICMP time stamp request including the first mobile station referenced time (Block 405). The request message is received at the networked GPS time server at a first GPS referenced time (Block 410). The GPS time server accesses the requested GPS time information in response to the request message and transmits a single ICMP message to the mobile station at a second GPS referenced time. The single message can be a single ICMP time stamp reply message including a first and second GPS referenced times and the first mobile station referenced time (Block 415).

The single ICMP message is received at the mobile station at a second mobile station reference time (Block 420). A propagation delay estimate is determined for the single ICMP message by subtracting an elapsed GPS referenced time interval that occurred at the GPS time server while servicing the request from a "roundtrip" time between the time when the request was made to the time when the message was received at the mobile station. The elapsed GPS referenced time interval includes the time between when the request was received at the networked GPS server and the time at which the single ICMP message was transmitted to the mobile station (Block 425).

The mobile station determines the current GPS referenced time at the mobile station by adding the propagation delay estimate to the second GPS referenced time (Block 430). In some embodiments according to the invention, further adjustments to the determined GPS referenced time can be made. For example, additional delays can be added to the second GPS referenced time to compensate for processing of the ICMP messages at the mobile station and overhead incurred in determining the GPS referenced time (Block 435). In some embodiments according to the invention, additional delays can be added to compensate for asymmetrical network overhead, such as GSM or GPRS network overhead.

Figure 6:
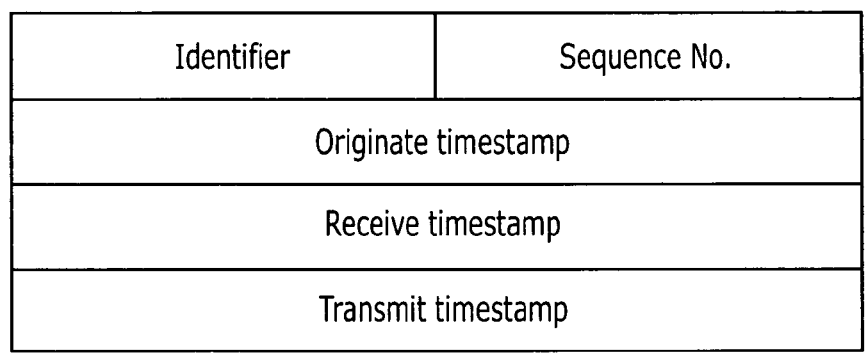
FIG. 6 is a schematic illustration of GPS time assistance requests and messages according to some embodiments of the invention.

FIG. 6 is a schematic illustration of GPS time assistance requests and GPS time assistance messages according to some embodiments of the invention. As shown in FIG. 6, the request/message includes an identifier field that identifies whether the remaining data is associated with a request or a message. In either case, the request/message includes three separate fields within which time stamp information can be included (and accessed). In particular, the request/message includes an originate time stamp, a receive time stamp, and a transmit time stamp. In some embodiments according to the invention, the originate time stamp is used to store the mobile station reference time at which the mobile station transmits a request to the network GPS time server.

In some embodiments according to the invention, the receive and transmit time stamps contain the GPS referenced times provided by the networked GPS time server as part of the GPS time assistance message transmitted to the mobile station in response to the request. In particular, the receive time stamp field can be used to store the GPS reference time at which the networked GPS time server received the request. The transmit time stamp field can be used to store the GPS referenced time at which the networked GPS time server transmit the message to the mobile station.

It will be understood that the GPS time assistance request/message structure can be that of an ICMP message. In some embodiments according to the invention, the GPS time assistance request/message structure can be ICMP timetamp request/reply messages, which are sometimes commonly referred to as ping request messages and ping reply messages. ICMP message structures, including ping type messages, are described in RFC 792 specification located on the Internet at, http://www.faqs.org/rfcs/rfc792.html, support for which is considered mandatory in the implementation of a standard IP stack. The disclosure of RFC 792 is hereby incorporated herein by reference in its entirety. Other message structures can also be used.

Figure 7:
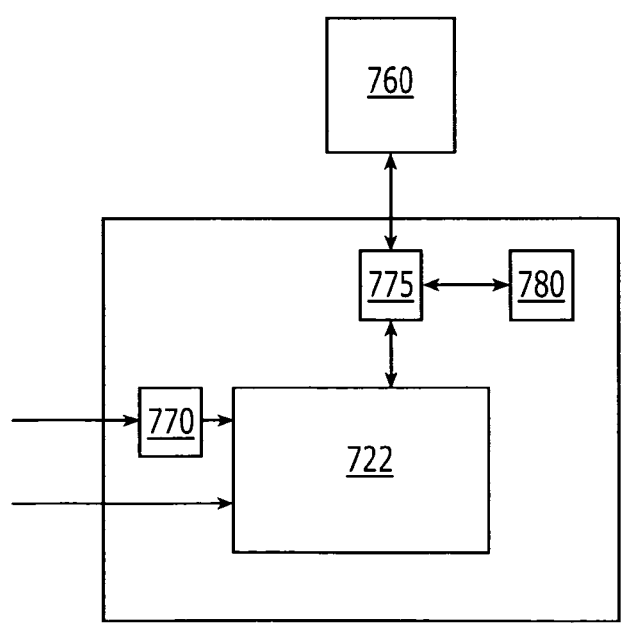
FIG. 7 is a schematic diagram that illustrates GPS referenced time according to some embodiments of the invention.

FIG. 7 is a block diagram that illustrates a networked GPS time server and a GPS time source according to some embodiments of the invention. According to FIG. 7, GPS time assistance requests are received at a networked GPS time server 735 and are processed using an IP stack 722 which can be implemented according to the description herein in reference to FIG. 5. In some embodiments according to the invention, the network GPS time server 735 includes an application 770 which can access the internetwork layer of the IP stack 722 by utilizing upper layers of the IP stack 722 as discussed above, for example, in reference to FIG. 5. The IP stack 722 responds to the request by accessing a GPS time source 760 to provide a time that indicates a GPS referenced time at which the GPS time assistance request was received by the network GPS time server 735. The IP stack 722 also accesses the GPS time source 760 to obtain time that indicates when the network GPS server 735 transmits a GPS time assistance message in response to the request.

It will be understood that the IP stack 722 formats the message to include the GPS referenced time at which the network GPS time server 735 receive the request and the GPS reference time at which the network GPS time server 735 transmits the message to the mobile station in response to the request. It will be further understood that the GPS time assistance message can also include time stamp information included with the request that indicates the mobile station referenced time at which the request was transmitted by the mobile station. The GPS referenced times included in the GPS time assistance message reflect an elapsed interval that occurred at the network GPS time server 735 while the GPS time assistance request was being processed. The mobile station can use the elapsed GPS reference time at the network GPS time server to determine the delay incurred by the propagation of the message from the network GPS time server to the mobile station.

It will be further understood that the network GPS time server 735 can include a GPS time switch 775 that redirects access from a system time source 780 to the GPS time source 760. As is understood by those having skill in the art, a conventional IP stack may respond to ICMP messages by accessing a local system time source, such as when processing a "ping" message, to provide the time stamp information requested. In some embodiments according to the invention, the GPS time source switch 775 redirects standard IP stack access from the system time source 780 to the GPS time source 760. Accordingly, an access by a standard IP stack can be redirected to the GPS time source 760 thereby reducing the amount of customization that may be needed to provide an IP stack according to embodiments of the invention.

As used herein, the phrase "GPS referenced time" refers to a Time Of Week (TOW) count, a word count, a data bit count, and a course acquisition (C/A) code repetition count. In some embodiments according to the invention, the GPS referenced time can provide accuracy of about 1 millisecond to within true GPS time. In some embodiments according to the invention, the TOW count can be a 17 bit truncated time of TOW count that, by itself, may provide accuracy to within 6 seconds of true GPS time. The bit word count can be a four bit word that identifies one of ten words included in a sub-frame in the TOW to provide 600 millisecond accuracy in conjunction with the TOW count. The data bit count can be a five bit data word that indicates one of 30 bits within a word included in a sub-frame which can provide 20 millisecond accuracy when combined with the word count and the TOW count. The C/A code repetition count can be a five bit word that indicates one of 20 repetitions per bit included in the ten 30 bit words of the sub-frame, which can provide about 1.0 millisecond accuracy when combined with the data bit count, the word count, and the TOW count. In some embodiments according to the invention, the structure of the GPS referenced time described above can be included in the time stamp field associated with the GPS time assistance message transmitted by the network GPS time server.

In some embodiments according to the invention, the number of bits used to represent GPS referenced time can be reduced by, for example, sub-sampling some of the fields described above. For example, in some embodiments according to the invention, the C/A-code repetition count can be sampled at a lower resolution. In some embodiments according to the present invention, higher order bits included in the TOW count may be excluded from the GSP referenced time information included in the message, but determined at the mobile station using, for example, a local real time clock. In some embodiments according to the invention, portions of the TOW count, such as the higher order TOW bits, can be transmitted in other messages that are less sensitive to the propagation delay of the single message including the lower order information.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A method of providing Global Positioning System (GPS) time assistance to a mobile station comprising:
    transmitting a message from a networked GPS time server to a mobile station, the message including GPS referenced time information indicating an elapsed GPS referenced time interval at the networked GPS time server between receiving a request for GPS time assistance at the networked GPS time server and transmitting the message to the mobile station, wherein transmitting is preceded by:
    accessing GPS referenced time from the networked GPS time server responsive to the request to provide a first GPS referenced time at the networked GPS time server when the message was received; and
    accessing GPS referenced time from the networked GPS time server responsive to the request to provide a second GPS referenced time at the networked GPS time server when the message is transmitted.

2. A method according to claim 1 wherein the message comprises an Internet Control Message Protocol message.

3. A method according to claim 1 wherein the GPS referenced time information comprises a first GPS referenced time at which the networked GPS time server received the request and a second GPS referenced time at which the networked GPS time server transmitted the message.

4. A method according to claim 3 wherein the GPS referenced time information further comprises:
    a mobile station referenced request time at which the mobile station transmitted the request to the networked GPS time server.

5. A method according to claim 4 wherein the message comprises a single ICMP message including the first and second GPS referenced times and the mobile station request time.

6. A method according to claim 4 further comprising:
    receiving the message at the mobile station at a mobile station referenced reception time at which the mobile station received the message from the networked GPS time server;
    determining a delay associated with propagation of the message from the networked GPS time server to the mobile station based on the mobile station referenced reception time and the mobile station referenced request time; and
    determining a mobile station GPS time based on the second GPS referenced time at which the networked GPS time server transmitted the message and the delay.

7. A method according to claim 6 wherein determining the delay further comprises:
    determining the delay based on the mobile station referenced reception time, the mobile station referenced request time, and the first and second GPS referenced times.

8. A method of providing Global Positioning System (GPS) time assistance to a mobile station comprising:
    transmitting a request for GPS time assistance information from a mobile station to a networked GPS time server at a first mobile station referenced time;
    receiving the request for GPS time assistance information at the networked GPS time server at a first GPS referenced time;
    transmitting a single ICMP message from the networked GPS time server to the mobile station at a second GPS referenced time, the single ICMP message including at least the first and second GPS referenced times;
    receiving the single ICMP message at the mobile station at a second mobile station referenced time; and
    determining a current GPS referenced time at the mobile station based on the first and second GPS referenced times and the first and second mobile station referenced times.

9. A method according to claim 8 wherein transmitting the single ICMP message further comprises:
    transmitting the single ICMP message including the first mobile station referenced time.

10. A method according to claim 8 wherein the first and second GPS referenced times indicate an elapsed GPS referenced time interval at the networked GPS time server between receiving the request for GPS time assistance at the networked GPS time server and transmitting the message to the mobile station.

11. A method according to claim 8 wherein the determining further comprising:
    determining a delay associated with propagation of the message from the networked GPS time server to the mobile station based on a difference between the first and second mobile station referenced times; and
    determining a current GPS referenced time based on the second GPS referenced time at which the networked GPS time server transmitted the message and the delay associated with propagation of the message.

12. A computer-readable medium having computer-executable instructions for performing the steps recited in claim 8.

13. A networked server for providing Global Positioning System (GPS) time assistance comprising:
    a networked GPS time server circuit configured to transmit a message to a mobile station via a network, the message including GPS referenced time information indicating an elapsed GPS referenced time interval at the networked GPS time server circuit between receiving a request for GPS time assistance at the networked GPS time server circuit and transmitting the message to the mobile station, wherein the networked GPS time server is configured to provide GPS referenced time responsive to the request to provide a first GPS referenced time at the networked GPS time server when the message is received and is configured to provide GPS referenced time responsive to the request to provide a second GPS referenced time at the networked GPS time server when the message is transmitted.

14. A networked server according to claim 13 wherein the message comprises an Internet Control Message Protocol (ICMP) message.

15. A networked server according to claim 14 wherein the ICMP message comprises a ping message.

16. A networked server according to claim 13 wherein the request for GPS time assistance comprises an ICMP time request message and the message comprises an ICMP time response message.

17. A networked server for providing Global Positioning System (GPS) time assistance comprising:
a networked GPS time server circuit configured to transmit a message to a mobile station via a network, the message including GPS referenced time information indicating an elapsed GPS referenced time interval at the networked GPS time server circuit between receiving a request for GPS time assistance at the networked GPS time server circuit and transmitting the message to the mobile station, wherein the message comprises an Internet Control Message Protocol (ICMP) message, and wherein GPS referenced time information comprises GPS Time-Of-Week (TOW) information and GPS sub-frame information indicating GPS time having a greater accuracy than the GPS TOW information alone.

18. A networked server according to claim 17 wherein the GPS referenced time information further comprises:
GPS data bit count information indicating a bit position within the GPS sub-frame information indicating GPS time having a greater accuracy than the GPS TOW information and the GPS sub-frame information alone.

19. A networked server according to claim 17 wherein the GPS referenced time information further comprises:
coarse acquisition code information indicating a coarse acquisition code repetition count within the GPS data bit count information indicating GPS time having a greater accuracy than the GPS TOW information, the GPS sub-frame information, and the GPS data bit count information alone.

20. A networked server for providing Global Positioning System (GPS) time assistance comprising:
a networked GPS time server circuit configured to transmit a message to a mobile station via a network, the message including GPS referenced time information indicating an elapsed GPS referenced time interval at the networked GPS time server circuit between receiving a request for GPS time assistance at the networked GPS time server circuit and transmitting the message to the mobile station, wherein the message comprises an Internet Control Message Protocol (ICMP) message, and wherein the GPS referenced time information comprises:
GPS Time-Of-Week (TOW) information; and
four bits of GPS sub-frame information indicating a word position within a frame of the GPS TOW information;
five bits of GPS data bit count information indicating a bit position within the GPS sub-frame information; and
coarse acquisition code information indicating a coarse acquisition code repetition count within the GPS data bit count information.

21. A networked server according to claim 20 wherein the GPS TOW information is separated into at least two ICMP messages, or excludes at least some of the most significant bits of the GPS TOW information.

22. A networked server according to claim 20 wherein the coarse acquisition code information comprises between one and five bits inclusive.

23. A networked server for providing Global Positioning System (GPS) time assistance comprising:
a GPS time source configured to provide GPS referenced time information comprising GPS Time-Of-Week (TOW) information and GPS sub-frame information indicating GPS time having a greater accuracy than the GPS TOW information alone; and
an IP stack including an ICMP compliant protocol layer configured to request GPS referenced time information from the GPS time source responsive to ICMP time stamp request messages and configured to transmit ICMP time reply messages including the GPS referenced time information.

24. A networked server according to claim 23 wherein the GPS referenced time information comprises:
a first GPS referenced time associated with when the ICMP time request message was received by the networked server; and
a second GPS referenced time associated with when the ICMP time replay message is transmitted by the networked server.

25. A networked server according to claim 23 further comprising:
an application layer of the IP stack; and
an application configured to receive the GPS time assistance requests from mobile stations and configured to provide GPS time assistance information in response thereto, wherein the application is configured to access the ICMP compliant protocol layer through the application layer of the P stack.

26. A networked server according to claim 23 further comprising:
a GPS time source switch coupled between the IP stack and the GPS time source, wherein the GPS time source switch is configured to direct requests for GPS referenced time information to the GPS time source and direct GPS referenced time information from the GPS time source to the IP stack and configured to direct requests for server time information to a server time source and direct server referenced time information from the server time source to the IP stack.

27. A networked server according to claim 23 wherein the GPS referenced time information further comprises:
GPS data bit count information indicating a bit position within the GPS sub-frame information indicating GPS time having a greater accuracy than the GPS TOW information and the GPS sub-frame information alone.

28. A networked server according to claim 27 wherein the GPS referenced time information further comprises:
coarse acquisition code information indicating a coarse acquisition code repetition count within the GPS data bit count information indicating GPS time having a greater accuracy than the GPS TOW information, the GPS sub-frame information, and the GPS data bit count information alone.

29. A computer-readable medium having computer-executable instructions for implementing the networked server recited in claim 23.

30. A GPS enabled mobile station comprising:
a processor circuit configured to determine current GPS referenced time at a mobile station derived from a single message from a networked GPS time server, the single message including GPS referenced time information and delay information associated with propagation of the message to the mobile station wherein the GPS referenced time information comprises a first GPS referenced time at which the networked GPS time server received the request and a second GPS referenced time at which the networked GPS time server transmitted the message, wherein the GPS referenced time information comprises GPS Time-Of-Week (TOW) information and GPS sub-frame information indicating GPS time having a greater accuracy than the GPS TOW information alone.

31. A GPS enabled mobile station according to claim 30 wherein the message comprises an Internet Control Message Protocol message.

32. A computer-readable medium having computer-executable instructions for performing the steps recited in claim 30.

33. A GPS enabled mobile station according to claim 30 wherein the GPS referenced time information further comprises:

GPS data bit count information indicating a bit position within the GPS sub-frame information indicating GPS time having a greater accuracy than the GPS TOW information and the GPS sub-frame information alone.

34. A GPS enabled mobile station according to claim 33 wherein the GPS referenced time information further comprises:

coarse acquisition code information indicating a coarse acquisition code repetition count within the GPS data bit count information indicating GPS time having a greater accuracy than the GPS TOW information, the GPS sub-frame information, and the GPS data bit count information alone.

* * * * *

UNITED STATES PATENT AND TRADEMARK OFFICE
CERTIFICATE OF CORRECTION

| | |
|---|---|
| PATENT NO. | : 7,228,138 B2 |
| APPLICATION NO. | : 10/729354 |
| DATED | : June 5, 2007 |
| INVENTOR(S) | : Hansson et al. |

It is certified that error appears in the above-identified patent and that said Letters Patent is hereby corrected as shown below:

Column 13, Claim 19, Line 28: Please correct "claim 17"
To read -- claim 18--

Column 14, Claim 25, Line 24: Please correct "P"
To read -- IP--

Signed and Sealed this

Eighteenth Day of September, 2007

JON W. DUDAS
*Director of the United States Patent and Trademark Office*